United States Patent
Kisenwether (10) Patent No.: US 7,036,757 B2
(45) Date of Patent: May 2, 2006

(54) VEGETATION SHREDDING AND DISPERSAL APPARATUS

(75) Inventor: David Kisenwether, Sugarloaf, PA (US)

(73) Assignee: Material Innovations Manufacturing, Sugarloaf, PA (US)

( * ) Notice: Subject to any disclaimer, the term of this patent is extended or adjusted under 35 U.S.C. 154(b) by 91 days.

(21) Appl. No.: 10/685,875

(22) Filed: Oct. 14, 2003

(65) Prior Publication Data

US 2005/0077404 A1    Apr. 14, 2005

(51) Int. Cl.
*B02C 19/12* (2006.01)

(52) U.S. Cl. ............................ 241/186.35; 241/101.76; 241/605

(58) Field of Classification Search ................ 241/605, 241/186.35, 189.1, 101.76
See application file for complete search history.

(56) References Cited

U.S. PATENT DOCUMENTS 5,505,391 A * 4/1996 Krueger et al. ............... 241/55
5,573,190 A * 11/1996 Goossen ....................... 241/27
6,467,710 B1 * 10/2002 Patterson ...................... 241/34

* cited by examiner

*Primary Examiner*—Mark Rosenbaum
(74) *Attorney, Agent, or Firm*—Bigelow Law Firm; Richard L. Bigelow (57) ABSTRACT

A vegetation shredding and dispersal apparatus that comprises a conveying platform, a cutting/agitating mechanism, and a blower apparatus. The conveying platform and the cutting/agitating mechanism are substantially wide enough to simultaneously process 2 or more bales of mulching vegetation, yet the shredding and dispersal apparatus is still narrow enough to meet state and federal vehicle width requirements. The wide conveying platform comprises two or more conveying chain assemblies to introduce the baled vegetation into the rotating cutters/agitators, which are essentially the same width as the conveyor platform. The shredded mulch is then fluidized by the cutters/agitators and then directed to the blower intake by the vacuum created by the blower. The shredded mulch is then ejected from the blower and spread onto newly seeded areas to prevent ground erosion and to promote seed germination. The wider platform conveyor allows more bales of vegetation to be pre-staged and reduces the time expended on reloading the vegetation shredding and dispersal apparatus. The extra width also allows the rapid introduction of multiple bales of hay into the cutters/agitators. This rapid introduction of hay into the shredding and dispersal apparatus allows for quicker and more economical completion of construction, landscaping, erosion control, highway, and similar projects.

10 Claims, 7 Drawing Sheets

VEGETATION SHREDDING AND DISPERSAL APPARATUS

CROSS REFERENCE TO RELATED APPLICATIONS

None

FEDERAL RESEARCH STATEMENT

None

BACKGROUND OF THE INVENTION

This invention relates to an improved apparatus and method for shredding and dispersing baled vegetation, including hay, straw or any other material suitable for mulching purposes. More specifically, the invention relates to the rapid introduction of multiple bales of hay into a mulching and dispersal apparatus. This rapid introduction of hay into the shredding and dispersal apparatus allows for quicker and more economical completion of construction, landscaping, erosion control, highway, and similar projects.

The use of vegetation mulching and dispersal methods and equipment is widely used in many fields of endeavor. For example, as new highways are built or existing highways rebuilt or refurbished, there is a need to rapidly reseed and cover with mulch the ground along and contiguous to the highways. This task must be completed as quickly as possible for two primary reasons: 1) to keep the costs as low as possible and 2) to minimize the amount of ground erosion.

Similarly, large building construction projects often involve large excavation and grading components. Rapid seeding and mulch overlays are imperative in order to prevent erosion and present a "finished" appearance. Once again, swiftness of the reseeding and mulch overlaying procedure is imperative in order to minimize costs and prevent soil erosion.

Generally, these seeding and mulch overlaying projects involve the introduction of hay in either rectangular or cylindrical bales into an apparatus that shreds the bales of hay into mulchable material, and then spreads it through some blower apparatus over newly laid seed. Many of these projects require seeding and mulch overlaying of hundreds of acres. Clearly, time is of the essence in completing these projects.

As of now most entities use the industry standard, labor intensive, rectangular bale of approximately 18 inches wide by approximately 14 inches high by approximately 3 feet long. However, large cylindrical and rectangular bales are gaining popularity due to the practicality of using machinery to move them. This not only eliminates the manual labor but also allows a larger volume of hay or straw to be moved in less time. The most popular cylindrical bale is approximately 5 feet in diameter by approximately 6 feet in length. There are two popular sizes of large rectangular bales. The first is approximately 32 inches by approximately 32 inches by approximately 8 feet and the second is approximately 48 inches by approximately 48 inches by approximately 8 feet. The use of large rectangular bales is more practical due to their ease in handling, optimized storage and transportation characteristics, and their gaining availability. The present invention is designed to capitalize on the advantages of large rectangular bales and yet be able to use any size or shape of bale if it is necessary.

Whatever size or shape of bales used, the key is to introduce as much hay or other vegetation into the shredding and blower apparatus as quickly as possible. A key constraint in designing optimum mulching machines is the fact that most of these machines must be continually transported on or even perform the majority of their work on roads and highways. They therefore must conform to a variety of federal, state and local laws and regulations with respect to size. Among the most restrictive constraints is the requirement that the maximum width of any vehicle driven or transported over roads and highways be no more than 102 inches (eight and a half feet) without obtaining a special permit. Given the amount of time that these machines are on the roads and highways and the complexity of the permitting process, it is rarely economical and efficient to produce machines that are greater than 102 inches in width.

Machines that shred, and disperse bales of various types of vegetation are common in the prior art. For example, U.S. Pat. Nos. 6,572,039; 5,622,323; 5,240,188; 5,556,041; 2,789,399; 5,209,413; 2,842,897; 2,949,871; 2,952,493 well define the prior art over the last forty years. Earlier machines were designed to use the common size of the above mentioned small rectangular bales (18 inches wide by 14 inches high by 3 feet long). These machines are very manpower intensive. As of late machines have been introduced to the market that are capable of utilizing the larger bales. All of these large bale machines utilize a conveyor system to automatically feed bales into the shredding component. These prior art, large bale machines are a significant step forward but their productivity is limited by the amount of baled material that their conveyor systems can hold. It stands to reason that the more bales that the machines conveyor can hold, the larger the area that can be mulched without stopping to reload.

Labor costs are a major component of the overall cost of seeding and mulching projects. Any machine that can reduce the manpower requirements and/or perform the seeding/mulching processes more quickly and yet stay within the governmental road and highway requirements without requiring special permits represents a significant step forward in reducing overall costs and improving efficiencies for such projects.

SUMMARY OF THE INVENTION

The present invention is directed toward an apparatus wherein bales of vegetation of various shapes and sizes are automatically fed into a shredding component where the bales are broken apart into constituent components and then a into blower component where the broken up vegetation is directed onto the ground. As used herein, the term "straw" or "mulch" shall refer to any material that is suitable for providing adequate ground cover and soil erosion control, and specifically includes, but is not limited to hay, grass, stalks (such as corn stalks and bean stalks), and other forms of suitable mulching matter. Furthermore, the term "bale" shall refer to any substantially compacted and constrained (i.e. tied with string or twine) form of "straw" or "mulch" in a rectangular, cylindrical, or any other appropriate configuration.

The present invention includes three primary components: 1) a platform with a set of at least two conveyor chain assemblies on the top of said platform such that bales can be moved automatically into the shredding mechanism via the conveyor chain assemblies; 2) a shredding component wherein the bales come into contact with a series of at least two rotating cutters/agitators that tear apart the bales and agitate the vegetation into much smaller pieces of mulch; and 3) a blower section wherein the mulch is directed out onto the surface to be covered. All three of the above described components are mounted preferably on a truck chassis or alternatively are mounted on some type of trailer chassis that can be towed behind some sort of tractor.

The conveyor platform, which is considerably wider than the prior art, must be configured with at least two and preferably three conveyor chain assemblies. Each chain assembly preferably contains at least two chains connected by multiple cross links. Alternatively, each chain assembly could contain three or more chains or the chain assemblies could be replaced with multiple individual chains with no attaching cross links. The platform is configured such that it is equal to or less than 102 inches wide in order to conform to federal and state highway statutes and regulations. The 102 inch width allows bales of any size or shape to be loaded onto the conveyor platform and subsequently automatically and simultaneously transported into the shredding apparatus. More specifically the optimum use of the 102 inch width is to utilize the larger rectangular bales, such as three 32 inch by 32 inch by 8 foot bales or two 48 inch by 48 inch by 8 foot bales. The bales are placed longitudinally side by side across the width of the platform and are automatically transported simultaneously into the shredding apparatus.

Given that three 32 inch bales and two 48 inch bales when placed side by side will result in a total width of 96 inches, the 102 inch wide platform is preferable due to the fact that over time the compacted bales decompress and expand and the 102 inch width is necessary to accommodate the slightly larger decompressed and expanded bales sitting next to each other. If the platform size were to be restricted to less than 102 inches, decompressed and expanded bales would tend to jam and not be able to be transported into the mulching mechanism.

While there are other systems available on the market that utilize a conveyor chain assembly, there appears to be no other apparatus that is of the width of the present invention and none that comprises three sets of conveyor chain assemblies and allows the introduction of two or three bales into the shredding mechanism simultaneously.

The conveyor platform is also designed to be of optimum length. A larger platform means more bales can be stored or pre-staged on the platform before it is necessary to reload. Clearly, the less frequently that reloading is required, the quicker a mulching operation can be performed. However, a smaller platform allows a shorter vehicle wheelbase, which determines how maneuverable the machine will be. Since the most popular bale to be used by the present invention will be both of the large rectangular sizes (i.e. 32 inches by 32 inches by 8 feet and 48 inches by 48 inches by 8 feet) and they are both 8 feet long it stands to reason that the platform should be a multiple of 8 with some allowance for decompression and expansion. For the average job the optimum length of the platform to be used for storing or pre-staging the bales of hay is 17 feet, or two expanded and decompressed bale lengths. The length of the storing/pre-staging platform can be changed to reconfigure the machine without affecting the other mechanisms of the invention.

The blower mechanism and shredding mechanism of the present invention are similar to other mechanisms that are on the market today. However, the shredding mechanism is unique in two ways. Other shredding mechanisms are configured such that only one large bale can be transported into the shredder at one time. The mechanism and process embodied in the present invention can simultaneously transport and shred two or more bales. Therefore the shredding mechanism must, by definition, be uniquely wider than the current state of the art, but yet can be no more than 102 inches wide and still meet state and federal highway width requirements.

The second unique and non-obvious feature of this invention is the manner in which up to 102 inches of width of bales to be shredded is directed into the blower intake that is only 18 inches in diameter. The narrower machines of the prior art use a variety of mechanisms to direct the shredded mulch into the blower intake. These machines use funneling surfaces, augers, or beaters to direct the shredded mulch into the blower intake. All these mechanisms require power for operation. Obviously, directing the additional mulched vegetation associated with simultaneously mulching multiple large or very large bales on the wider 102 inch platform to the blower intake would require a larger directing mechanism and more power to operate it. The present invention utilizes no specific mechanism to direct the shredded mulch into the blower intake. Instead the bottom, side, and back panels of the shroud surrounding the shredding mechanism are positioned in close proximity to the rotating cutters/agitators. The shroud should be between 0.25 and 12 inches from the arc defined by the rotating cutters/agitators, with 1 inch being the preferred distance on the bottom and 3 inches being the preferred distance on the back. The suction created at the intake of the blower mechanism is sufficient to draw virtually all of the shredded mulch into the blower as is further described below.

There are two reasons for placing the shroud close to the cutters/agitators. The first is that no space is left for the shredded mulch to drift toward the bottom of the mechanism and "rest". Due to the close proximity of the shroud to the cutters/agitators, the shredded mulch is constantly being churned and suspended or "fluidized" in the air surrounding the cutters/agitators. The air that surrounds the cutters/agitators and that is laden with the shredded mulch is then pushed by atmospheric pressure toward the vacuum present at the blower intake. The second reason for the close proximity of the cutters/agitators to the shroud is to decrease the volume of air in the shroud. This lower volume will increase the velocity of the air/fluidized mulch mixture being pushed into the vacuum of the blower. Thus the fluidized, shredded mulch in the fast moving air eliminates any need for a separate mechanism to direct the shredded mulch into the blower. Therefore the present invention results in a more efficient shredding process due to the fact that no energy is required to move the fluidized mulch into the blower.

In summary, the two major distinguishing and unique features of the present invention are (1) the increased width of the platform on which bales are stored and pre-staged and (2) the close proximity of the shroud to the rotating cutters/agitators.

This invention allows the introduction of up to three times as many bales into the shredding mechanism than other current platform based systems. In addition to this fact the large conveyor platform increases the stored and pre-staged bale capacity of the invention and decreases the frequency of reloading. Thus the throughput of the machine is further increased and allows the more rapid completion of seeding and mulching operations, thereby reducing the costs and reducing the potential for environmental impacts of erosion significantly.

Work began on designing the present invention in September of 2001. Construction and testing started in January and continued through October 2002 when the apparatus was deemed ready for some limited use.

In an effort to determine the commercial viability of the present invention, limited test marketing was performed in late October 2002 through June of 2003. Brochures were drafted and distributed to approximately 50 different individuals and companies.

Development of the invention based on feedback from test marketing continued through the spring of 2003. The design for the present invention was finalized in July 2003 and the final design was reduced to practice and finally configured in July 2003. The final decision to seek a patent was made in July 2003.

DETAILED DESCRIPTION OF THE INVENTION

While the present invention will be described in greater detail in this section it is understood that a person skilled in the art may modify the herein described invention while achieving some or all of the results of this invention. Therefore the descriptions that follow are to be understood as illustrative and exemplary of specific embodiments within the broad scope of the present invention and not as limiting the scope of the invention. In the following descriptions, like numbers refer to similar features or like elements throughout. In order to facilitate understanding of the present invention and claims associated with it, the following convention is adopted regarding the size of vegetation bales: "small" sized bale shall refer to a 14 inch by 18 inch by 3 foot long bale; "large" sized bale shall refer to a 32 inch by 32 inch by 8 feet long bale; and "very large" sized bale shall refer to a 48 inch by 48 inch by 8 feet long bale.

Figure 1:
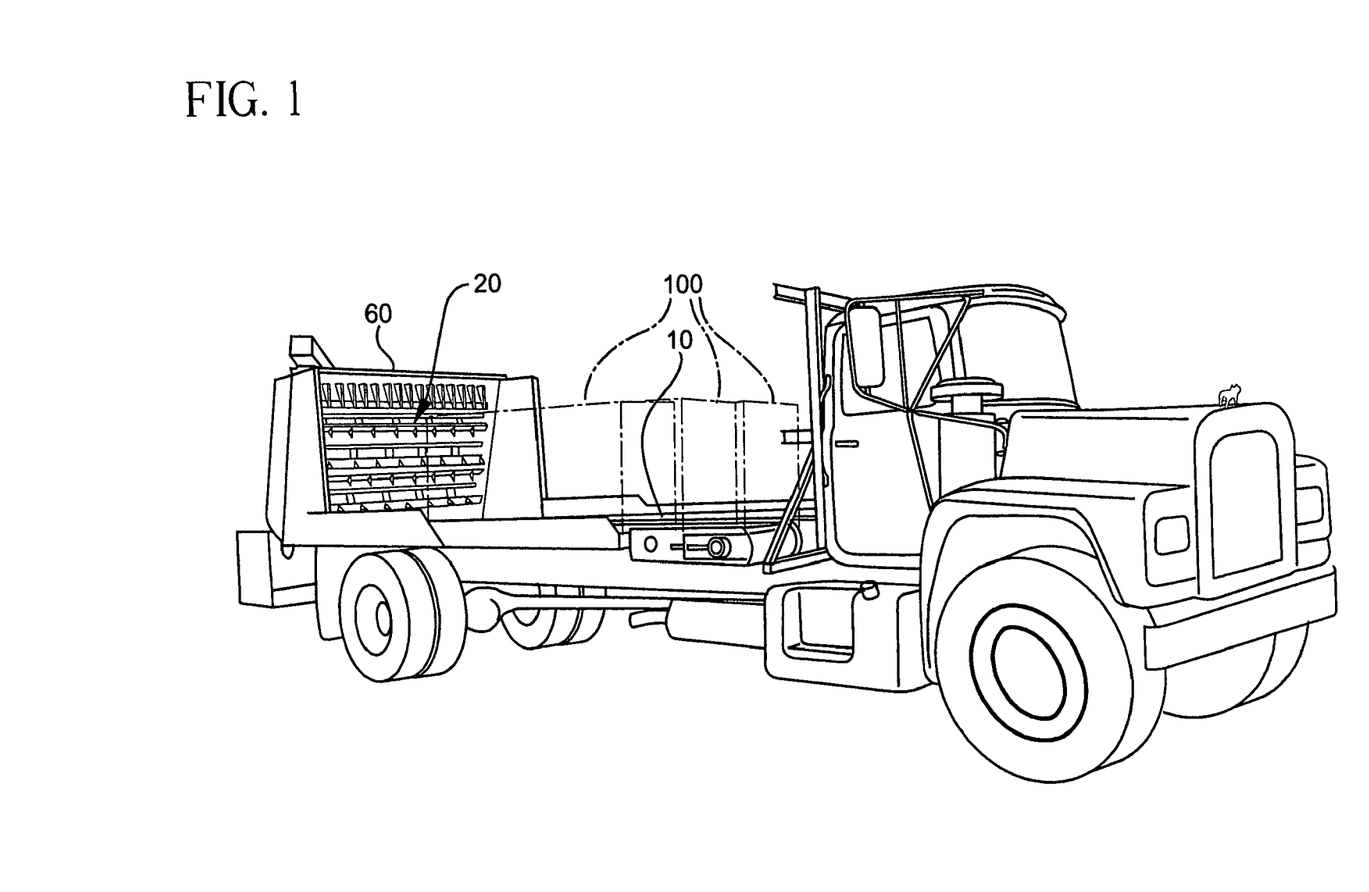
FIG. 1 is a left front ground level perspective of the integral cab, chassis, platform, mulcher, blower mechanism. It shows the manner in which three standard bales can be placed on the platform/conveyor assembly for simultaneous introduction into the mulching mechanism.

Referring to the figures and in particular referring to FIG. 1, the Improved Vegetation Shredding and Dispersal Apparatus is shown from a ground level perspective from the right front of the vehicle. As can be clearly seen from this aspect, the platform 10 on which the bales reside is much wider than platforms in the prior art and in fact in this figure the platform is 102 inches wide. Also, the shredding and mulching mechanism 20 is much wider than such mechanisms in the prior art and in fact in this figure, the mechanism is 102 inches wide. FIG. 1 also shows the shroud 60 that encloses the shredding mechanism on the top, bottom, and sides and three bales 100 superimposed on the platform.

While FIG. 1 shows an integrated platform, mulcher/shredder, blower assembly and cab/drive train assembly, the present invention can also mounted on towed/trailer assembly.

Furthermore, while FIG. 1 shows a platform that is approximately 16 feet in length, the platform can be of any length that is allowable in accordance with federal and state highway laws and regulations. In reality, the platform must be at least 8 feet long in order to accommodate at least one large or very large bale of vegetation. Furthermore, the platform should probably be some multiple of 8 feet in length since the large and very large bales are 8 feet long.

Figure 2:
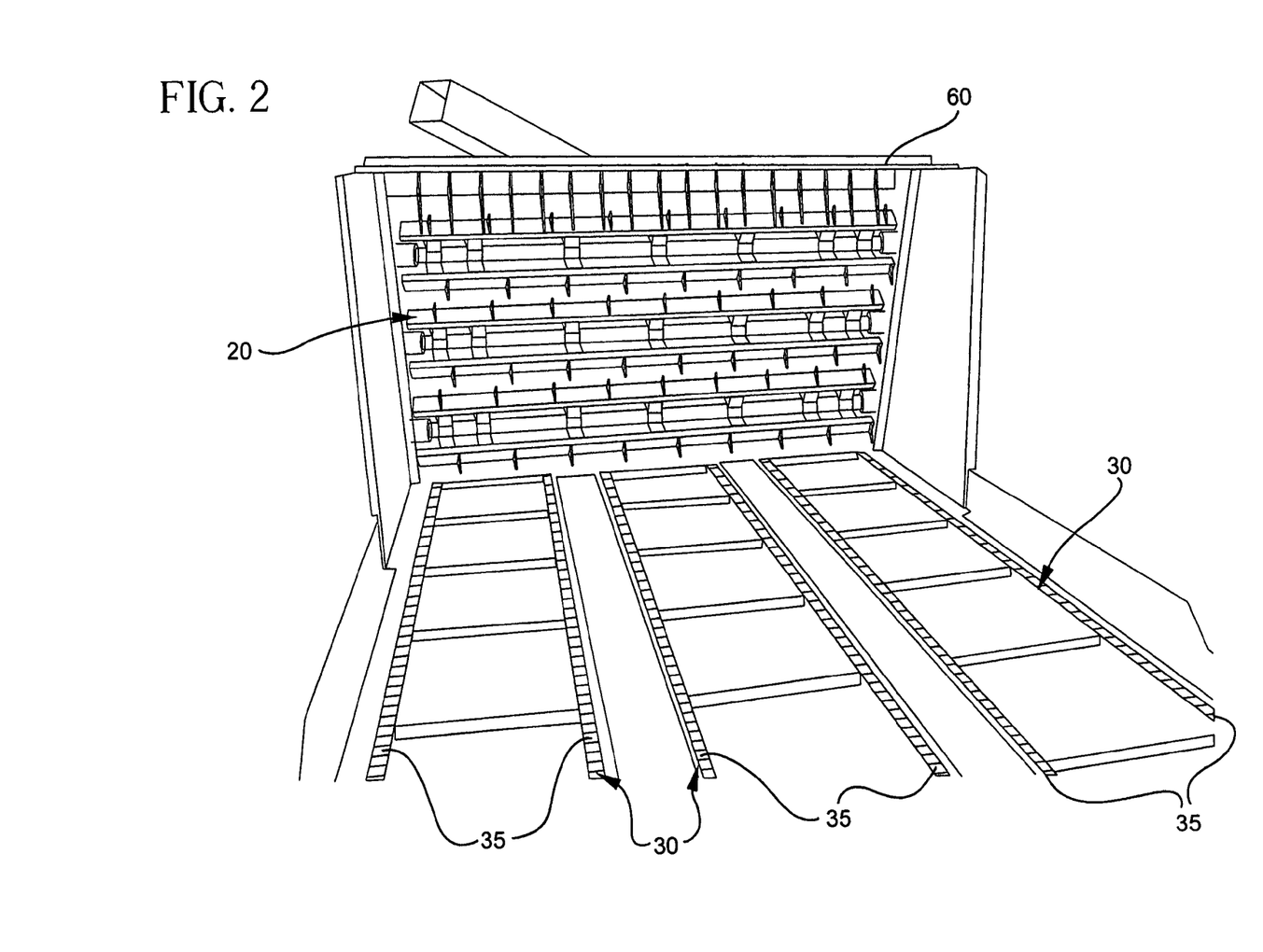
FIG. 2 is a view of the platform that shows the three sets of chain conveyors as well as the agitator/cutters that comprise the mulching mechanism. The blower chute is shown behind the mulching mechanism.

Referring to FIG. 2, the three sets of conveyor chains 30 are shown. Each set of conveyor chains contains at least two individual chains 35. Two sets of conveyor chains could be used, but three are preferred. This figure also shows the shredding and mulching mechanism 20. Clearly, the shredding/mulching mechanism extends the entire width of the platform, in this case, 102 inches.

Figure 3:
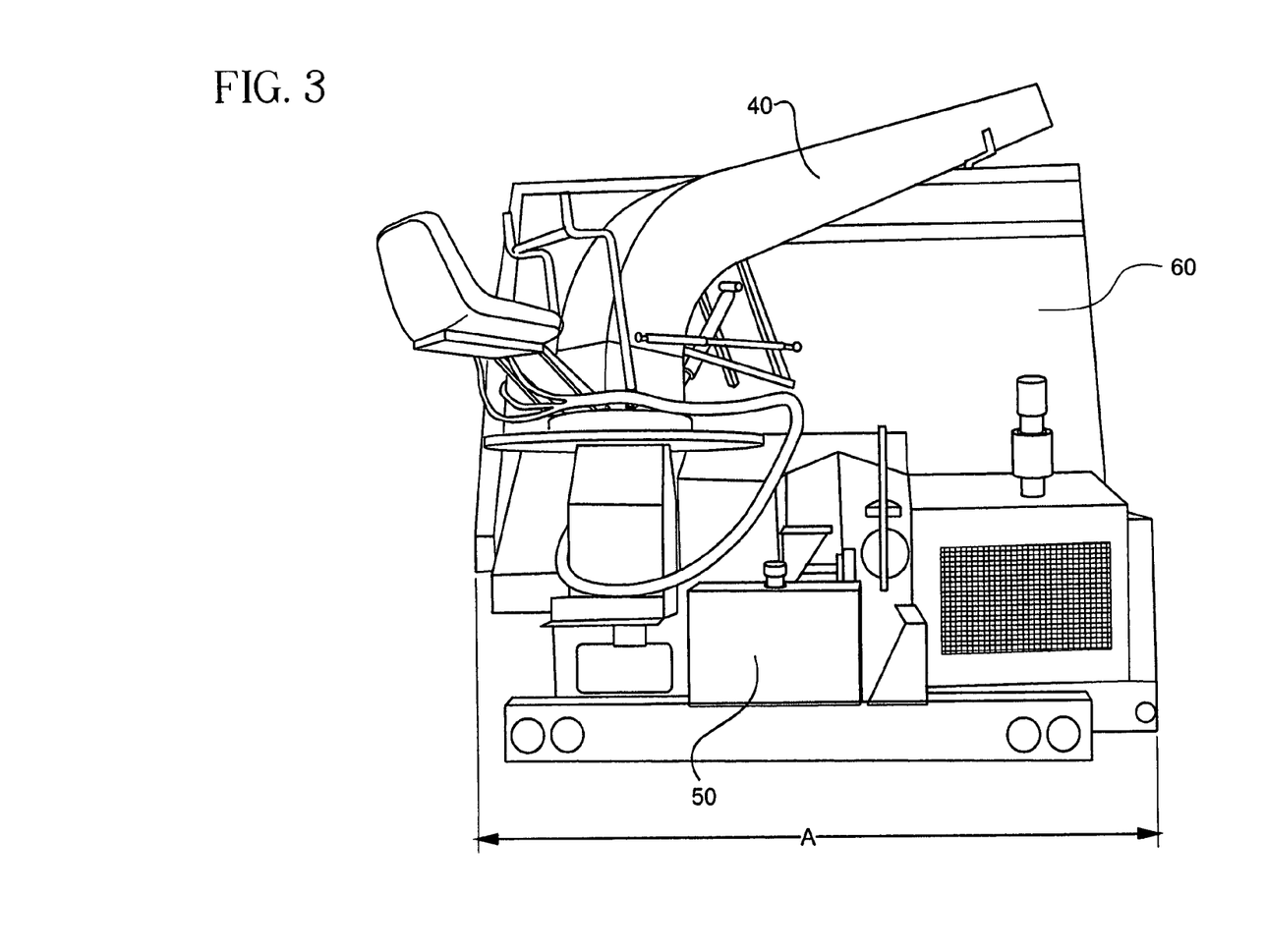
FIG. 3 is a rear view of the apparatus showing the blower chute and further showing via the license plate on the vehicle that it does not require a special wide load permit to move the vehicle along the roads and highways.

Referring to FIG. 3, the rear of the apparatus is shown. This view shows the blower chute 40 and blower mechanism 50. The dimension line at showing the width of the vehicle and apparatus is delineated as "A". The dimension A can range between 84 and 102 inches. In the preferred mode, the dimension A is equal to 102 inches.

Figure 4:
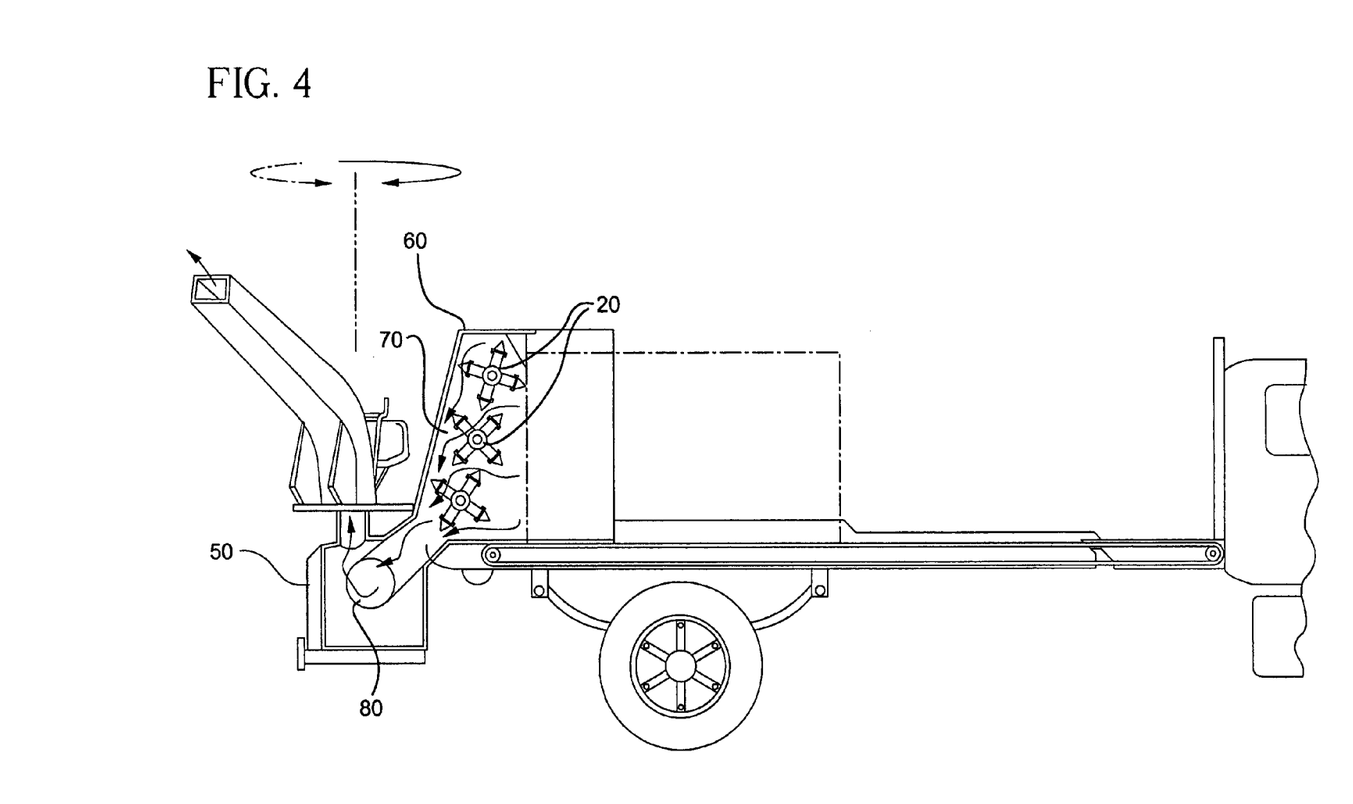
FIG. 4 is a cutaway side view of the shredder showing the close proximity of the shroud to the cutters/agitators.

Referring to FIG. 4, a close up cut away side view of the shredding and mulching mechanism 20 and the shroud 60 is shown. This view clearly shows the much smaller than normal open area 70 between the shredding and mulching mechanism 20 and the shroud 60. This reduced area is achieved by placing the shroud between 0.25 and 12 inches from the shredding and mulching mechanism. In this instance, the distance is approximately 3 inches, which is the preferred distance. This reduced distance is key to the enhanced efficient operation of the apparatus. The reduced distance translates to a reduced volume of open space in which the fluidized air/vegetation mixture is located after it passes through the shredding and mulching mechanism. The reduced volume is important in that it permits virtually all the fluidized air/vegetation mixture to move directly into the suction port of the blower mechanism without settling to the bottom of the platform. This is accomplished solely with the force supplied by the blower mechanism 80. Prior art mechanisms require a separate source of force to move all the air/mulched vegetation mixture into the blower. Use of such a separate source of force requires that power be diverted from the blower mechanism and thereby reduces the overall efficiency of the entire apparatus. The fact that the present invention requires no such additional source of power renders the present invention much more efficient and cost effective.

Figure 5:
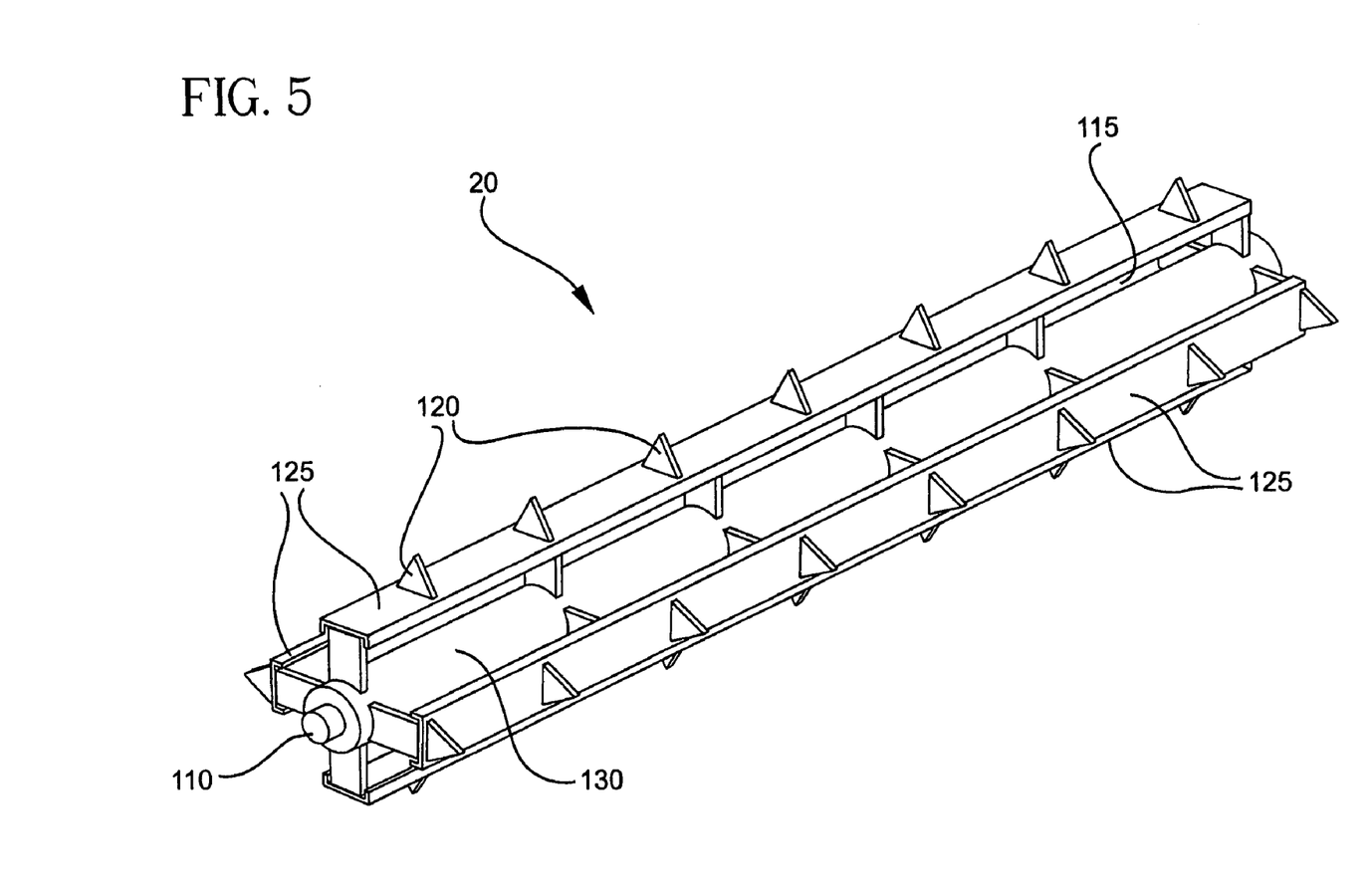
FIG. 5 is a view of one of the individual cutter/agitator mechanisms that shows the unique construction of the mechanism including the open area through which the fluidized air and mulch mixture moves.

Referring to FIG. 5, an individual cutter/agitator mechanism 110 is shown. The cutter/agitator rotates as the bales are transported into the cutter/agitator mechanism by the chain assemblies. As the bales impinge upon the rotating cutter/agitators, the bales are torn apart by the triangular cutters 120. The unique feature of the cutter/agitator mechanism is that it there is an opening 115 between the plate 125 on which the cutters are placed and the center mandril 130 of the cutter/agitator mechanism, thereby allowing the air/mulch mixture to move through the interior of the mechanism and into the void area between the cutter/agitators and the shroud and eventually into the intake of the blower mechanism.

Figure 6:
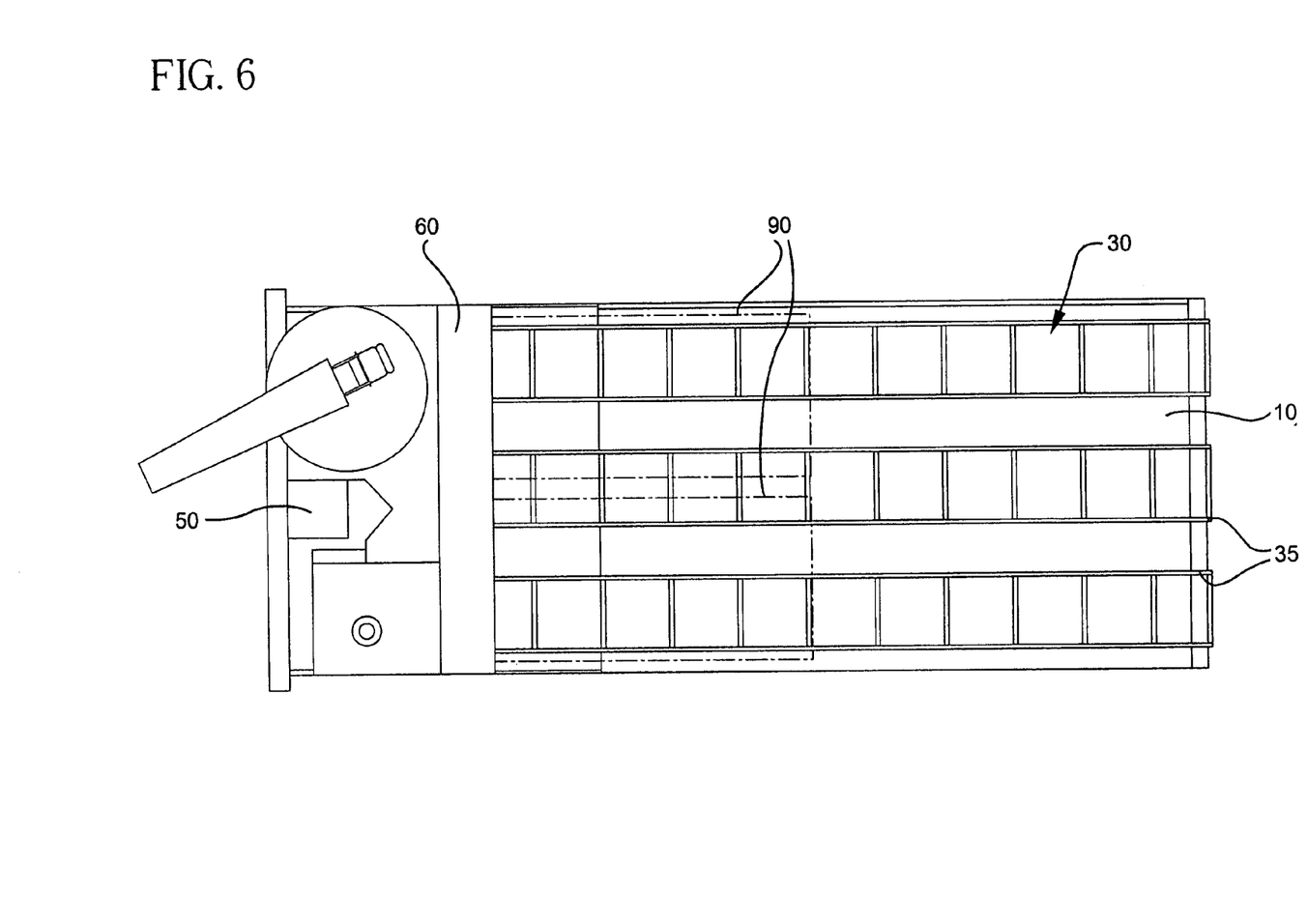
FIG. 6 is a top view of the platform/shredder apparatus showing a series of two very large 48 inches by 48 inches by 8 feet bales aligned side by side longitudinally ready for transportation into the shredding mechanism.

Referring to FIG. 6, the longitudinally aligned side-by-side positioning of two very large 48 inch by 48 inch by 8 feet long bales 90 of vegetation on the platform 10 is depicted. Even allowing for some decompression and expansion of these very large bales, the 102 inch width of the platform and shredding and mulching mechanism is sufficient. While FIG. 5 shows rectangular bales, similarly sized cylindrical bales could be placed on the platform for transportation into the shredding and mulching mechanism.

Figure 7:
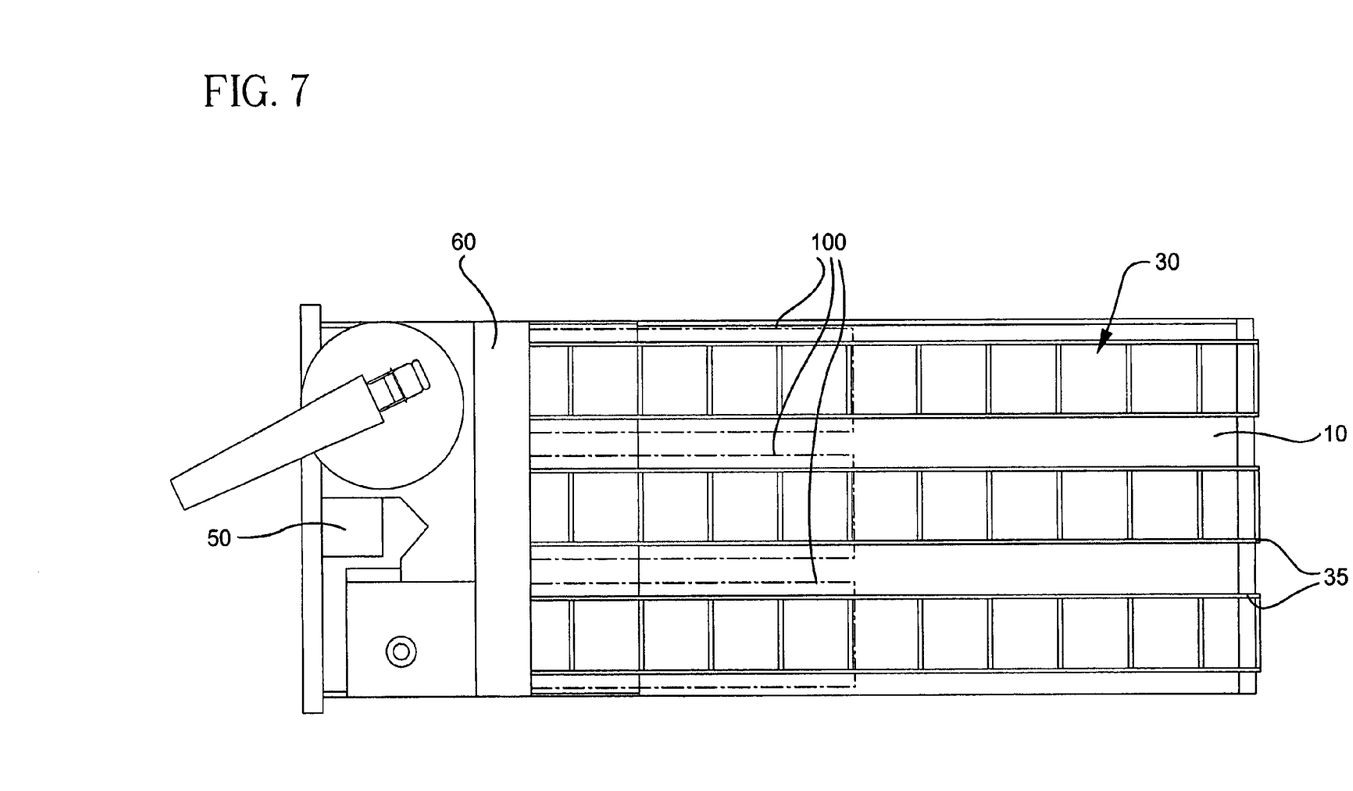
FIG. 7 is a top view of the platform/shredder apparatus showing a series of three large 32 inches by 32 inches by 8 feet bales aligned side by side longitudinally ready for transportation into the shredding mechanism.

Referring to FIG. 7, the longitudinally aligned side-by-side positioning of three large 32 inch by 32 inch by 8 feet long bales 100 of vegetation on the platform 10 is depicted. Even allowing for some decompression and expansion of these very large bales, the 102 inch width of the platform and shredding and mulching mechanism is sufficient. While FIG. 6 shows rectangular bales, similarly sized cylindrical bales could be placed on the platform for transportation into the shredding and mulching mechanism.

I claim the following:

1. An improved, integrated, self-propelled, highway-legal vegetation shredding and dispersal apparatus capable of shredding and dispersing two or more bales of vegetation simultaneously comprising:
   a. a conveyor platform that is between 84 and 102 inches wide whereon said bales of vegetation can be placed;
   b. a shredding component wherein said bales of vegetation come into contact with at least two rotating cutters/agitators that tear apart the bales and agitate the vegetation into much smaller pieces of mulch;
   c. at least two sets of cross-linked conveyor chain assemblies embedded in said conveyor platform whereon said bales of vegetation can be transported into the shredding component;
   d. a blower section wherein the mulch is ingested through an intake port and is directed out an exhaust chute onto a surface to be covered; and
   e. a shroud which forms a barrier between said shredding component and said blower section and which is attached to the intake of said blower section.

2. An apparatus as in claim 1 where there is no additional mechanical device to force or move the mulched vegetation into the blower section.

3. An apparatus as in claim 1 where the shroud is positioned between 0.25 and 12 inches from the arc defined by the rotation of the cutters/agitators in the shredding component.

4. An apparatus as in claim 3 where the bottom of the shroud is positioned 1 inch from the arc defined by the rotation of the lowest positioned cutter/agitator in the shredding component and the back of the shroud is 3 inches from the arc defined by the rotation of the cutters/agitators.

5. An apparatus as in claims 1, 2, or 3 wherein there is sufficient force from the blower mechanism to fluidize the air/mulch mixture and pull said mixture through the blower intake and force said air/mulch mixture out a dispersal chute.

6. An apparatus as in claims 1, 2, 3, or 4 wherein the length of the platform is between 16 and 34 feet.

7. An apparatus as in claims 1, 2, 3, or 4 wherein the rotating cutter/agitators comprise a center mandrill, at least two arms axially mounted between 3 and 12 inches away from said mandrill through which the fluidized air/mulch mixture can move, and at least four cutting pieces affixed mechanically to said arms.

8. An apparatus as in claims 1, 2, or 3 where the two or more sets of cross-linked conveyor chain assemblies are replaced by four or more individual conveyor chains which are not cross-linked.

9. An apparatus as in claims 1, 2, or 3 where the rotating cutters/agitators are between 84 and 102 inches wide.

10. An improved vegetation shredding and dispersal apparatus capable of shredding and dispersing two or more bales of vegetation simultaneously comprising:
   a. a conveyor platform that is 102 inches wide whereon said bales of vegetation can be placed;
   b. a shredding component wherein said bales of vegetation come into contact with three rotating cutters/agitators that tear apart the bales and agitate the vegetation into much smaller pieces of mulch, said rotating cutters/agitators being 102 inches long;
   c. three sets of cross-linked conveyor chain assemblies embedded in said conveyor platform whereon said bales of vegetation can be transported into the shredding component;
   d. a blower section wherein the mulch is ingested through an intake port and is directed out an exhaust chute onto a surface to be covered; and
   e. a shroud which forms a barrier between said shredding component and said blower section and which is attached to the intake of said blower section, and wherein the shroud is positioned three inches from the arc defined by the rotating cutter/agitator assemblies.

* * * * *